United States Patent
Sato

(10) Patent No.: US 9,665,323 B2
(45) Date of Patent: May 30, 2017

(54) PRINT CONTROL DEVICE USING SETTING VALUE LIMITATION INFORMATION THAT LIMITS A PRINT SETTING VALUE SELECTABLE BY A USER PROGRAM AND PRINT SYSTEM THEREFORE

(71) Applicant: Konica Minolta, Inc., Tokyo (JP)

(72) Inventor: Koji Sato, Itami (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/177,731

(22) Filed: Jun. 9, 2016

(65) Prior Publication Data

US 2016/0371041 A1  Dec. 22, 2016

(30) Foreign Application Priority Data

Jun. 18, 2015  (JP) ................................ 2015-123203

(51) Int. Cl.
*G06F 15/00* (2006.01)
*G06F 3/12* (2006.01)
*G06K 1/00* (2006.01)

(52) U.S. Cl.
CPC .......... *G06F 3/1239* (2013.01); *G06F 3/1204* (2013.01); *G06F 3/1219* (2013.01); *G06F 3/1288* (2013.01)

(58) Field of Classification Search
CPC .... G06F 3/1239; G06F 3/1203; G06F 3/1219; G06F 3/123; G06F 3/1289; G06F 3/1293

USPC ............................... 358/1.1, 1.15, 1.14, 1.13
See application file for complete search history.

(56) References Cited

U.S. PATENT DOCUMENTS

| | | | |
|---|---|---|---|
| 8,253,952 B2* | 8/2012 | Tsuchitoi | G06F 3/1204 358/1.13 |
| 2006/0268306 A1* | 11/2006 | Kojima | H04N 1/00233 358/1.13 |
| 2014/0333960 A1* | 11/2014 | Fukasawa | G06K 15/1817 358/1.15 |

FOREIGN PATENT DOCUMENTS

JP  2002-169433 A  6/2002

* cited by examiner

*Primary Examiner* — Douglas Tran
(74) *Attorney, Agent, or Firm* — Buchanan Ingersoll & Rooney PC

(57) ABSTRACT

A print control device includes: an acquisition unit that acquires setting value limitation information; and a control unit that controls whether the execution of a print job is allowed, wherein the control unit: allows the execution of the print job without requiring access to a print management server under a condition that the print job has the content of print setting conforming to the setting value limitation information; attempts the access; in a case where the access is successful, allows the execution of the print job under a condition that the print job has the content of print setting conforming to the setting value limitation information updated through the access; and even in a case where the access is failed, allows the execution of the print job under a condition that the print job has the content of print setting conforming to the setting value limitation information before update.

9 Claims, 12 Drawing Sheets

FIG. 4

LIMITATION SETTING SCREEN — 210

<SETTING ITEM "PRINT TYPE">
FIX TO SETTING VALUE "DOUBLE-SIDED PRINTING" : ● YES  ○ NO

<SETTING ITEM "COLOR">
PROHIBIT SELECTION OF SETTING VALUE "FULL-COLOR PRINTING" : ○ YES  ● NO

<SETTING ITEM "TONER SAVE MODE">
FIX TO SETTING VALUE "ON" : ● YES  ○ NO

[SETTING COMPLETION] — 211

PRINT CONTROL DEVICE USING SETTING VALUE LIMITATION INFORMATION THAT LIMITS A PRINT SETTING VALUE SELECTABLE BY A USER PROGRAM AND PRINT SYSTEM THEREFORE

The entire disclosure of Japanese Patent Application No. 2015-123203 filed on Jun. 18, 2015 including description, claims, drawings, and abstract are incorporated herein by reference in its entirety.

BACKGROUND OF THE INVENTION

Field of the Invention

The present invention relates to a print system and a technique relating thereto.

Description of the Related Art

In the past, print data has been transmitted to a printer (e.g., a multi-functional peripheral (MFP)) from a personal computer or the like to cause this printer to print the print data to output. At this time, by using a printer driver at the personal computer or the like, print setting values for various print setting items can be changed when the printing output is carried out.

Meanwhile, for the purpose of a reduced cost or the like, an administrator considers in some cases that it is desirable to limit the print setting value selectable by a user such that, among several print setting values (for example, "double-sided printing" and "single-sided printing") for a certain print setting item ("print type") whose setting can be changed using the printer driver, only a specific setting value ("double-sided printing") is selected by the user (such that "single-sided printing" is not selected).

In order to meet such a request, an action as described below is considered.

For example, it is considered that the administrator sets in advance limitation information that limits the print setting value selectable by the user for a certain print setting item (setting value limitation information), while the printer driver built in a print control device (personal computer) allows the execution of a print job under a condition that the print job has the content of print setting conforming to this setting value limitation information.

Specifically, the administrator sets the setting value limitation information in advance such that, for example, the user is only allowed to select the print setting value of "double-sided printing" for the print setting item of "print type" and thereafter, this setting value limitation information is stored to an external server (print management server). Every time the printer is used by the user (a startup instruction is given by the user), the printer driver sends a query to the print management server to acquire this setting value limitation information and then receives the print setting from the user in which the content of print setting conforms to this setting value limitation information. In this print setting, the user is only allowed to select the print setting value of "double-sided printing" for the print setting item of "print type", that is, the print setting value of "single-sided printing" cannot be selected. Subsequently, the printer driver allows the execution of the print job under a condition that the print job has the content of print setting conforming to this setting value limitation information.

This action as described above is repeated every time the printer is used by the user (a startup instruction for the printer driver is given by the user). Accordingly, the printer driver sends a query to the print management server to acquire the setting value limitation information every time the printer is used by the user.

Here, in a case where a query for the setting value limitation information is sent to the print management server every time the printer is used by the user, there is a risk of a decrease in operability for the user due to, for example, a time required for the query to the print management server.

For a solution to such a problem, a valid period is considered to be configured for the setting value limitation information such that the setting value limitation information within the print control device is used during this valid period without sending a query for the setting value limitation information to the print management server.

For example, according to a technique disclosed in JP 2002-169433 A, the setting value limitation information (limitation information) having a valid period (time limit for validity) is acquired from a server to be stored within a copier. Accordingly, a query for the setting value limitation information is not sent to the server during this valid period and instead, the setting value limitation information within the copier is used for printing. Once this valid period has passed, the limitation information within the copier is deleted. Thereafter, when the copier is used again, another query for the setting value limitation information is sent to the server and then the setting value limitation information is acquired from the server.

In the technique disclosed in JP 2002-169433 A, however, in a case where access to the server is failed due to, for example, communication error between the copier and the server when another query for the setting value limitation information is sent to the server after the valid period has passed, the setting value limitation information cannot be acquired from the server. When the setting value limitation information is not acquired from the server after the valid period has passed, because the valid period has passed, the setting value limitation information within the copier has been deleted. For this reason, the copier can no longer allow the user to use the own device (execute the print job). In other words, when access to the print management server is failed after the valid period for the setting value limitation information has passed, a service of the printer (the MFP or the like) is uniformly suspended, consequently causing a problem where the user can no longer use the printer.

SUMMARY OF THE INVENTION

Considering this situation, an object of the present invention is to provide a technique capable of preventing a service of a printer from being uniformly suspended when access to a print management server is failed after a valid period for setting value limitation information has passed.

To achieve the abovementioned object, according to an aspect, a print control device reflecting one aspect of the present invention comprises: an acquisition unit that acquires, from a print management server capable of communicating with the print control device, setting value limitation information that limits a print setting value selectable by a user among a plurality of print setting values for a specific print setting item, to store within the print control device; and a control unit that controls whether the execution of a print job is allowed based on the setting value limitation information within the print control device, wherein the control unit: allows the execution of the print job during a valid period set for the setting value limitation information without requiring access to the print management server under a condition that the print job has the content of print setting conforming to the setting value limitation information; attempts the access after the valid period has passed; in a case where the access is successful, allows the execution of the print job under a condition that the print job has the content of print setting conforming to the setting value limitation information updated through the access; and even in a case where the access is failed after the valid period has passed, allows the execution of the print job during an acceptable period provided so as to follow the valid period under a condition that the print job has the content of print setting conforming to the setting value limitation information before update.

According to an invention of Item. 2, in the print control device of Item. 1, once the access is successful, the acquisition unit preferably acquires newer setting value limitation information from the print management server and uses the newer setting value limitation information as the updated setting value limitation information.

According to an invention of Item. 3, in the print control device of Item. 1, the acquisition unit: in a case where the access is successful, when newer setting value limitation information is found within the print management server, preferably acquires the newer setting value limitation information from the print management server and uses the newer setting value limitation information as the updated setting value limitation information; and even in a case where the access is successful, when the newer setting value limitation information is not found within the print management server, preferably uses the setting value limitation information before update as the updated setting value limitation information.

According to an invention of Item. 4, in the print control device of any one of Items. 1 to 3, in a case where the access is failed after the valid period has passed and then the acceptable period has passed, the control unit preferably prohibits the execution of the print job.

According to an invention of Item. 5, in the print control device of any one of Items. 1 to 3, in a case where the access is failed after the valid period has passed and then the acceptable period has passed, the control unit preferably allows the execution of the print job under a condition that the print job has the content of print setting conforming to alternative setting value limitation information used as a substitute for the setting value limitation information and stored within the print control device.

According to an invention of Item. 6, in the print control device of Item. 5, the alternative setting value limitation information preferably has stricter limitation content than the limitation content of the setting value limitation information.

According to an invention of Item. 7, in the print control device of Item. 5 or 6, in a case where the access is successful, when newer alternative setting value limitation information is found within the print management server, the acquisition unit preferably acquires the newer alternative setting value limitation information from the print management server and updates the alternative setting value limitation information within the print control device to the newer alternative setting value limitation information.

To achieve the abovementioned object, according to an aspect, a non-transitory recording medium storing a computer readable program built in a print control device reflecting one aspect of the present invention causes a computer to carry out: a) a process of acquiring, from a print management server capable of communicating with the print control device, setting value limitation information that limits a print setting value selectable by a user among a plurality of print setting values for a specific print setting item, to store within the print control device; and b) a process of controlling whether the execution of a print job is allowed based on the setting value limitation information within the print control device, wherein in the process b): the execution of the print job is allowed during a valid period set for the setting value limitation information without requiring access to the print management server under a condition that the print job has the content of print setting conforming to the setting value limitation information; the access is attempted after the valid period has passed; in a case where the access is successful, the execution of the print job is allowed under a condition that the print job has the content of print setting conforming to the setting value limitation information updated through the access; and even in a case where the access is failed after the valid period has passed, the execution of the print job is allowed during an acceptable period provided so as to follow the valid period under a condition that the print job has the content of print setting conforming to the setting value limitation information before update.

To achieve the abovementioned object, according to an aspect, a print system reflecting one aspect of the present invention comprises: a print management server; and a print control device capable of communicating with the print management server, wherein the print management server includes a transmission unit that transmits, to the print control device, setting value limitation information that limits a print setting value selectable by a user among a plurality of print setting values for a specific print setting item, the print control device includes: an acquisition unit that acquires the setting value limitation information from the print management server to store within the print control device; and a control unit that controls whether the execution of a print job is allowed based on the setting value limitation information within the print control device, and the control unit: allows the execution of the print job during a valid period set for the setting value limitation information without requiring access to the print management server under a condition that the print job has the content of print setting conforming to the setting value limitation information; attempts the access after the valid period has passed; in a case where the access is successful, allows the execution of the print job under a condition that the print job has the content of print setting conforming to the setting value limitation information updated through the access; and even in a case where the access is failed after the valid period has passed, allows the execution of the print job during an acceptable period provided so as to follow the valid period under a condition that the print job has the content of print setting conforming to the setting value limitation information before update.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 4 is a diagram illustrating a limitation setting screen;

DESCRIPTION OF THE PREFERRED EMBODIMENTS

Hereinafter, an embodiment of the present invention will be described with reference to the drawings. However, the scope of the invention is not limited to the illustrated examples.

1. First Embodiment 1-1. Configuration Overview

Figure 1:
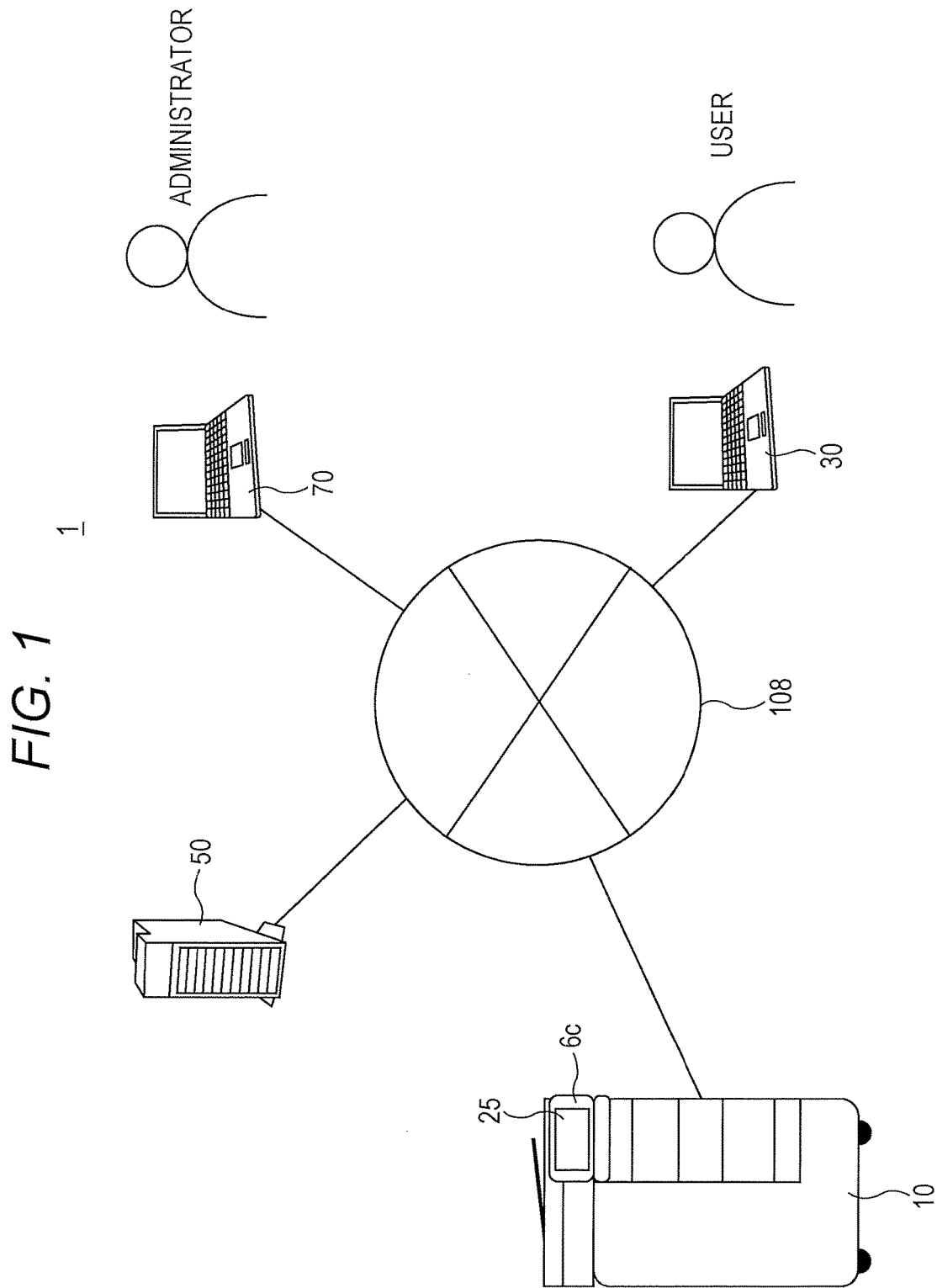
FIG. 1 is a schematic diagram illustrating a configuration of a print system.

FIG. 1 is a schematic diagram illustrating a configuration of a print system 1 according to the invention. As illustrated in FIG. 1, the print system 1 includes a multi-functional peripheral (also referred to briefly as MFP) 10 and computers 30, 50, and 70.

The MET 10 and the computers 30, 50, and 70 are interconnected through a network 108 and data can be received from/transmitted to each other among the respective devices 10, 30, 50, and 70. The network 108 includes various types of networks such as a local area network (LAN) and the Internet.

The computer 50 is a server computer, whereas the computers 30 and 70 are client computers. The computer 30 is a computer used by a user (ordinary user) of the MFP 10 (a computer for the user), while the computer 70 is a computer used by an administrator (administrative user) of the MET 10 (a computer for the administrator).

A print control program (here, a printer driver) is installed in the computer 30 and accordingly, the computer 30 functions as a print control device or the like that controls printing output at the MET 10.

A print management program (also referred to simply as management program) is installed in the computer 70. The management program is a program for managing the print control program, and so on. The computer 70 functions as a management device (print management device) that uses the management program to manage the action of the print control program (e.g., the printer driver).

<MFP 10>

The MFP 10 is a device provided with a scanner function, a printer function, a copy function, a facsimile communication function, and the like (also referred to as combined machine).

In particular, the MFP 10 functions as a printer (also referred to as image formation device or print output device) that executes a print job from the computer 30. Specifically, the computer 30 receives a print execution instruction from the user through the print control program (printer driver) or the like installed in this computer (print control device) 30 and then transmits the print job to the MFP 10 in accordance with the print execution instruction. The MFP 10 receives the print job transmitted from the computer 30 and then executes this print job. In this manner, the printing output processing is carried out by the MFP 10.

Figure 2:
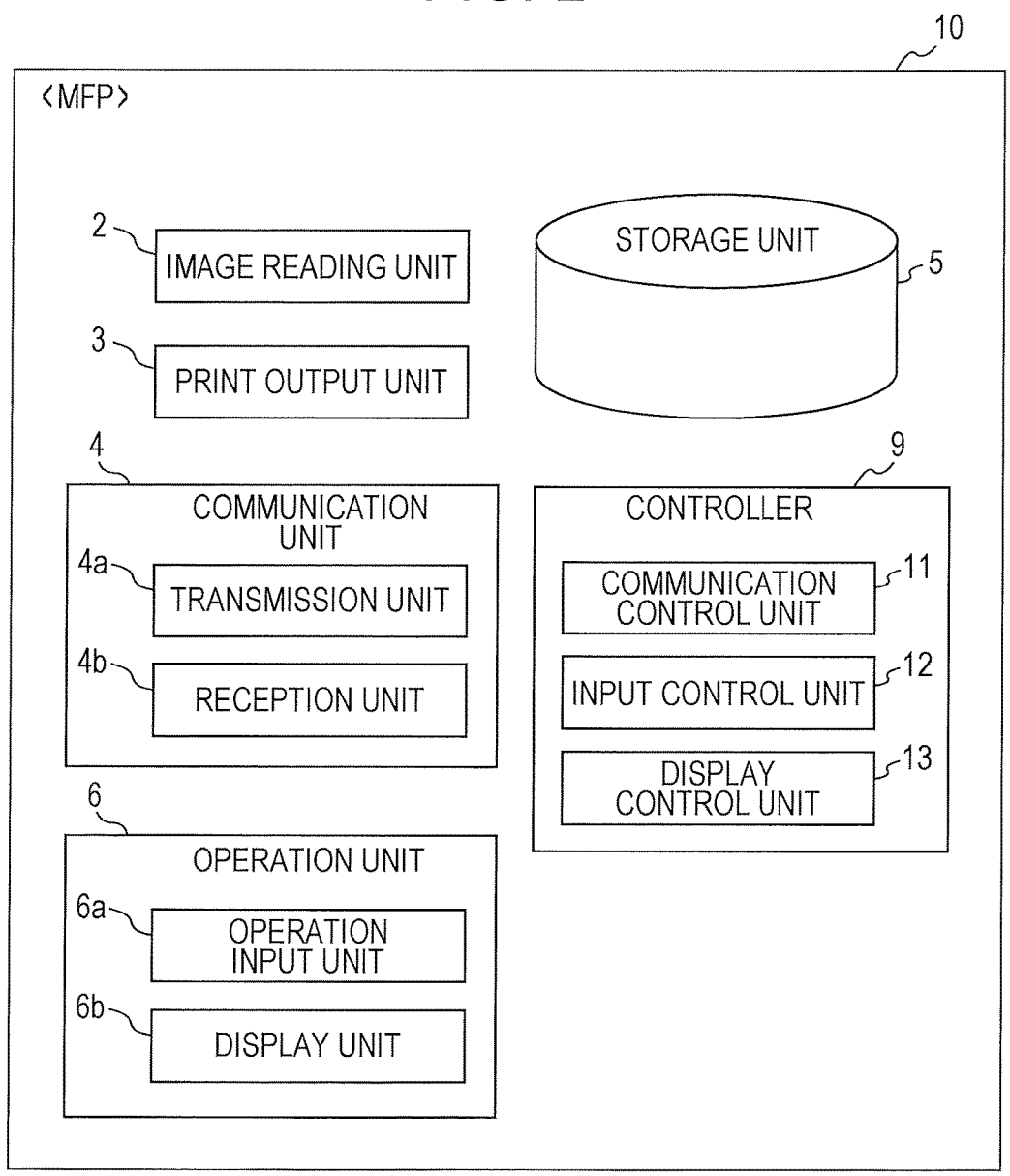
FIG. 2 is a diagram illustrating functional blocks of a print output device (MFP)

More specifically, as illustrated in a functional block diagram in FIG. 2, the MFP 10 includes an image reading unit 2, a print output unit 3, a communication unit 4, a storage unit 5, an operation unit 6, a controller 9, and the like. Various types of functions are realized by these multiple units combined to work together.

The image reading unit 2 is a processor that optically reads an original document placed on a predetermined position of the MFP 10 to generate image data of that original document (also referred to as document image).

The print output unit 3 is an output unit that outputs an image as a print out to various types of media such as paper based on the image data for the image to be printed.

The communication unit 4 is a processor capable of carrying out facsimile communication through a public line or the like. The communication unit 4 is also capable of network communication through the communication network 108. This network communication uses various types of protocols including a transmission control protocol/Internet protocol (TCP/IP) and a file transfer protocol (FTP). The MFP 10 can transfer various types of data mutually with a requested destination using this network communication. For example, the MFP 10 can also receive the print job from the computer (print control device) 30 using this network communication.

The storage unit 5 is constituted by a storage device such as a hard disk drive (HDD). The document image (image data) generated at the image reading unit 2 and the like is stored to this storage unit 5.

The operation unit 6 includes an operation input unit 6a that receives input to the MFP 10 and a display unit 6b that outputs various types of information as a display. Precisely, the MFP 10 is provided with an operation panel unit 6c (refer to FIG. 1). This operation panel unit 6c is constituted by a liquid crystal display panel in which a piezoelectric sensor and the like are built and functions as part of the display unit 6b while functioning as part of the operation input unit 6a.

The controller 9 is a control device built in the MFP 10 to comprehensively control the MFP 10 and constituted by including a CPU and various types of semiconductor memories (e.g., a RAM and a ROM).

<Computer 30>

The computer 30 is configured as a so-called personal computer.

Figure 3:
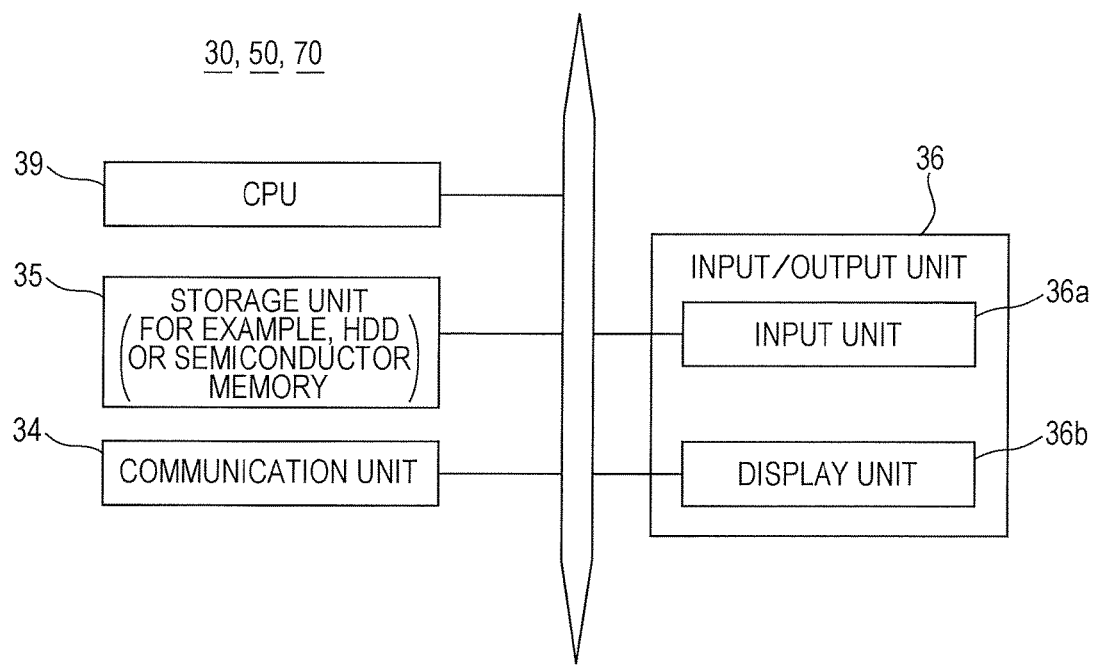
FIG. 3 is a block diagram illustrating a hardware configuration of a computer.

FIG. 3 is a block diagram illustrating a functional configuration of the computer (print control device) 30.

As illustrated in FIG. 3, the computer 30 is constituted by including a communication unit 34, a storage unit 35 (e.g., a semiconductor memory (RAM or the like) and a hard disk drive), an input/output unit 36, a CPU 39, and the like.

The communication unit 34 is capable of carrying out network communication through the communication network 108. This network communication uses various types of protocols including the TCP/IP. The computer 30 can transfer various types of data mutually with a requested destination using this network communication.

The input/output unit (operation input unit) 36 includes an input unit 36a that receives operation input to the computer 30 and a display unit 36b that outputs various types of information as a display. A keyboard, a mouse, and the like are provided as the input units 36a, whereas a liquid crystal display device or the like is provided as the display unit 36b. The print settings relating to various types of setting items of the printer driver are received through the input/output unit 36.

The computer 30 executes, on the CPU 39 (control unit) thereof, a predetermined software program (hereinafter, also referred to simply as program) stored in the storage unit 35 (a hard disk drive and/or a semiconductor memory) to realize the various types of the processors. This program may be recorded in a transportable recording medium such as a USB memory so as to be installed in the computer 30 through this recording medium, or alternatively, may be installed in the computer 30 through the network 108, or the like.

A predetermined operating system (OS) is installed in the computer 30. The print control program (printer driver) is called (started up) in response to a startup instruction from the user in an application software program or the like within the computer 30 and then executed.

The print control program is a program controlling the printing output by the MFP 10 (program for print control), while serving as a program used by the user of the MFP 10 at the computer 30 or the like. The print control program (printer driver) carries out a print setting action in accordance with the content of print setting (print setting value), for example, input through operation by an operator (user) and also carries out a print control action for the MFP 10 (printer). Subsequently, the MFP 10 carries out a print output action based on the print control action by the printer driver. As described above, the computer 30 uses the printer driver to function as the print control device controlling the printing output by the MFP 10 (printer).

During the print control action, the print control program allows the execution of the print job under a condition that the print job has the content of print setting conforming to setting value limitation information (to be described next) within the print control device 30.

This setting value limitation information acts as limitation information that limits the print setting value selectable by the user among a plurality of print setting values for a specific print setting item whose setting can be changed using the print control program.

The setting value limitation information is set at the computer 70 (print management device) in advance by the administrator and then stored to the print management server (computer 50). The print control program acquires the setting value limitation information from the print management server 50 to store within the print control device 30. Specifically, after the administrator sets a setting value limitation (also referred to as management policy) such that the user is only allowed to select a specific print setting value among a plurality of print setting values for a specific print setting item, the setting value limitation information including this setting value limitation (limitation content) is stored to the print management server 50.

Subsequently, the print control program receives, from the user, a setting having the content of print setting conforming to the setting value limitation information within the print control device 30, while receiving an execution instruction for the print job having this content of print setting. For example, in the case of the setting value limitation information set such that the print setting value for the print setting item of "print type" is fixed to "double-sided printing", the user is only allowed to select "double-sided printing" for the setting item of "print type" during print setting using the print control program. In other words, on a print setting screen of the print control program, the user cannot select an option other than "double-sided printing" (that is, "single-sided printing") for the setting item of "print type". The print job having the content of print setting conforming to the setting value limitation information is then transmitted to the MFP 10 from the print control device 30 and consequently, a document or the like to be printed is printed in "double-sided printing" at the MFP 10.

In the print control program, as described above, the content of print setting is set so as to conform to the setting value limitation information, while the execution of the print job transmitted to the MFP 10 from the print control device 30 is allowed under a condition that the print job has the content of print setting conforming to the setting value limitation information.

Figure 7:
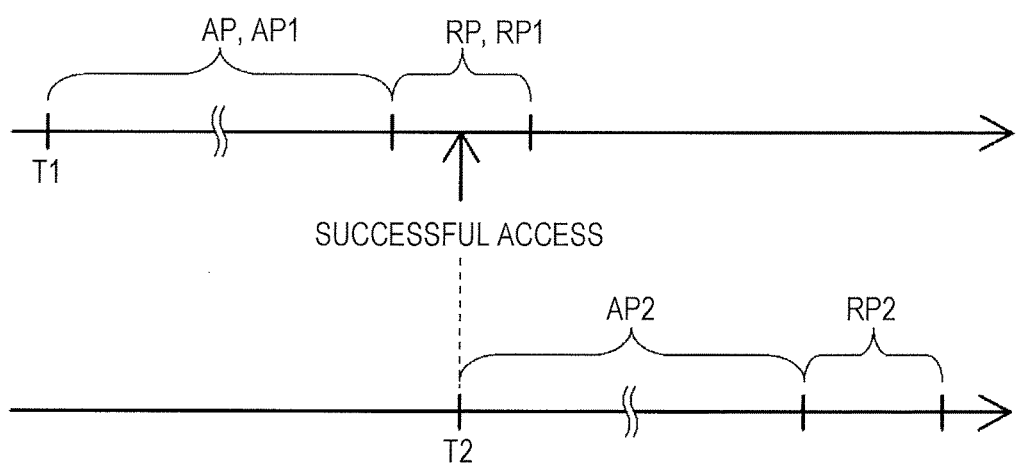
FIG. 7 is a conceptual diagram illustrating an action and so on when access to a print management server is successful during an acceptable period for setting value limitation information.

Note that, however, the print control program allows the execution of the print job (a service of the MFP 10) only during a valid period AP for the setting value limitation information (refer to FIG. 7) as a fundamental rule. Processing after the valid period AP has passed will be described later.

<Computer 70>

The computer 70 is also configured as a so-called personal computer and provided with a configuration similar to that of the computer 30. The computer 70 is a computer for the administrator and also referred to as print management device.

As described earlier, the print management program is installed in the computer 70. The print management program is a program managing the print control program (printer driver) used by the user of the MFP 10 at the computer 30 or the like.

As will be described later, the administrator uses the computer 70 (print management device) to set the setting value limitation information. Specifically, the administrator uses the print management device 70 to set the setting value limitation and respective periods (the valid period AP and an acceptable period RP (to be described later) for the setting value limitation information).

<Computer 50>

The computer 50 is configured as a server computer. The computer 50 is also provided with a configuration similar to those of the computers 30 and 70. The computer 50 is also referred to as print management server. For example, the setting value limitation information set by the administrator is stored to the computer 50. Additionally, in response to an access request from the computer 30 (print control device), the computer 50 transmits the setting value limitation information within the own device to this computer 30.

1-2. Action

According to the embodiment, when the print control program is started up at the print control device 30 during the valid period AP for the setting value limitation information, access to the print management server 50 is not required and accordingly, the setting value limitation information within the print control device 30 is used for the print setting by the user.

When the print control program is started up at the print control device 30 after the valid period AP for the setting value limitation information has passed, the access to the print management server 50 is attempted.

As a consequence of the successful access after the valid period AP has passed, the setting value limitation information within the print control device 30 is updated. The updated setting value limitation information is then used for the print setting by the user.

On the other hand, as a consequence of the access failure after the valid period AP has passed, the execution of the print job is prohibited (not allowed) as a fundamental rule. However, even in a case where the access is failed after the valid period AP has passed, the setting value limitation information before update is exceptionally used during the acceptable period RP (to be described later).

<1-2-1. Setting of Setting Value Limitation Information>

First, setting of the setting value limitation information by the administrator (the setting value limitation and the respective periods (the valid period AP and the acceptable period RP (to be described later) for the setting value limitation information)) will be described.

FIG. 4 is a diagram illustrating a setting screen (limitation setting screen) 210 for the setting value limitation.

Once the print management program is started up at the computer 70 (print management device), the limitation setting screen 210 is displayed on a display unit of the computer 70 after transition of several screens.

As illustrated in FIG. 4, the limitation setting screen 210 individually displays a plurality of print setting items (here, "print type", "color", and "toner save mode"). In addition, whether to limit the print setting value selectable by the user is also displayed for each of the print setting items in a radio button form. The print setting items that can be set on the limitation setting screen 210 are assumed to be determined in advance by the administrator or the like.

The administrator sets the setting value limitation for each of the three print setting items, namely, "print type", "color", and "toner save mode" on the limitation setting screen 210. The setting value limitations (limitation content) set by the administrator are used by the print control program at the print control device 30, where the user sets the content of print setting conforming to the setting value limitations on the print setting screen of the print control program.

Setting of the setting value limitation will be described hereinafter in regard to each of the print setting items.

First, the administrator sets whether to limit the print setting value selectable by the user among a plurality of print setting values ("double-sided printing" and "single-sided printing") for the print setting item of "print type" (here, whether to fix the setting value to "double-sided printing"). In other words, it is set for the print setting item of "print type" whether the number of options for the print setting value selectable by the user is reduced from the number of the print setting values prepared in the print control program (here, two print setting values, namely, "double-sided printing" and "single-sided printing").

For example, in a case where the setting value limitation in regard to the print setting item of "print type" is set such that the print setting value selectable by the user is fixed to "double-sided printing" ("Yes"), the print setting value for the print setting item of "print type" is fixed to "double-sided printing" on the print setting screen of the print control program in conformance to this setting value limitation. In other words, on this print setting screen, the user cannot select the print setting value of "single-sided printing" for the print setting item of "print type". On the other hand, in a case where the setting value limitation is set such that the setting value for the print setting item of "print type" is not fixed to "double-sided printing" ("No"), the setting value for the print setting item of "print type" is not fixed to "double-sided printing" on this print setting screen. In other words, on this print setting screen, the user can not only select the setting value of "double-sided printing" but also select the setting value of "single-sided printing" for the print setting item of "print type".

As illustrated in FIG. 4, the administrator here clicks on a radio button for fixing the setting value to "double-sided printing" ("Yes") to limit the print setting value such that only the print setting value of "double-sided printing" is selected by the user for the print setting item of "print type". In other words, the administrator reduces the number of options for the print setting value selectable by the user for the print setting item of "print type" to one option ("double-sided printing") from the number of the print setting values prepared in the print control program (two print setting values, namely, "double-sided printing" and "single-sided printing").

Next, the administrator sets whether to limit the print setting value selectable by the user among a plurality of print setting values ("full-color printing", "two-color printing" and "gray-scale printing") for the print setting item of "color" (here, whether to prohibit the selection of the setting value of "full-color printing"). In other words, it is set for the print setting item of "color" whether the number of options for the print setting value selectable by the user is reduced from the number of the print setting values prepared in the print control program (here, three print setting values, namely, "full-color printing", "two-color printing" and "gray-scale printing").

For example, in a case where the setting value limitation in regard to the print setting item of "color" is set such that the selection of the print setting value of "full-color printing" is prohibited for the user ("Yes"), the selection of the print setting value of "full-color printing" for the print setting item of "color" is prohibited for the user on the print setting screen of the print control program in conformance to this setting value limitation. In other words, the number of options for the print setting value selectable by the user for the print setting item of "color" is limited (reduced) to two options ("two-color printing" and "gray-scale printing") from three options ("full-color printing", "two-color printing" and "gray-scale printing"). On the other hand, in a case where the setting value limitation in regard to the print setting item of "color" is set such that the selection of the print setting value of "full-color printing" is not prohibited for the user ("No"), the selection of the print setting value of "full-color printing" for the print setting item of "color" is not prohibited for the user on this print setting screen.

As illustrated in FIG. 4, the administrator here clicks on a radio button for not prohibiting the selection of the setting value of "full-color printing" ("No") not to limit the print setting value for the print setting item of "color". In other words, the administrator allows the user to select the print setting value of "full-color printing" for the print setting item of "color".

Likewise, the administrator sets whether to limit the print setting value selectable by the user among a plurality of print setting values ("ON" and "OFF") for the print setting item of "toner save mode" (here, whether to fix the setting value to "ON (toner saving is enabled)"). As illustrated in FIG. 4, the administrator here clicks on a radio button for fixing the print setting value to "ON" ("Yes") to limit the print setting value such that only the print setting value of "ON" is selected by the user for the print setting item of "toner save mode".

As described above, the administrator sets the setting value limitation for each of the print setting items on the limitation setting screen 210.

Figure 5:
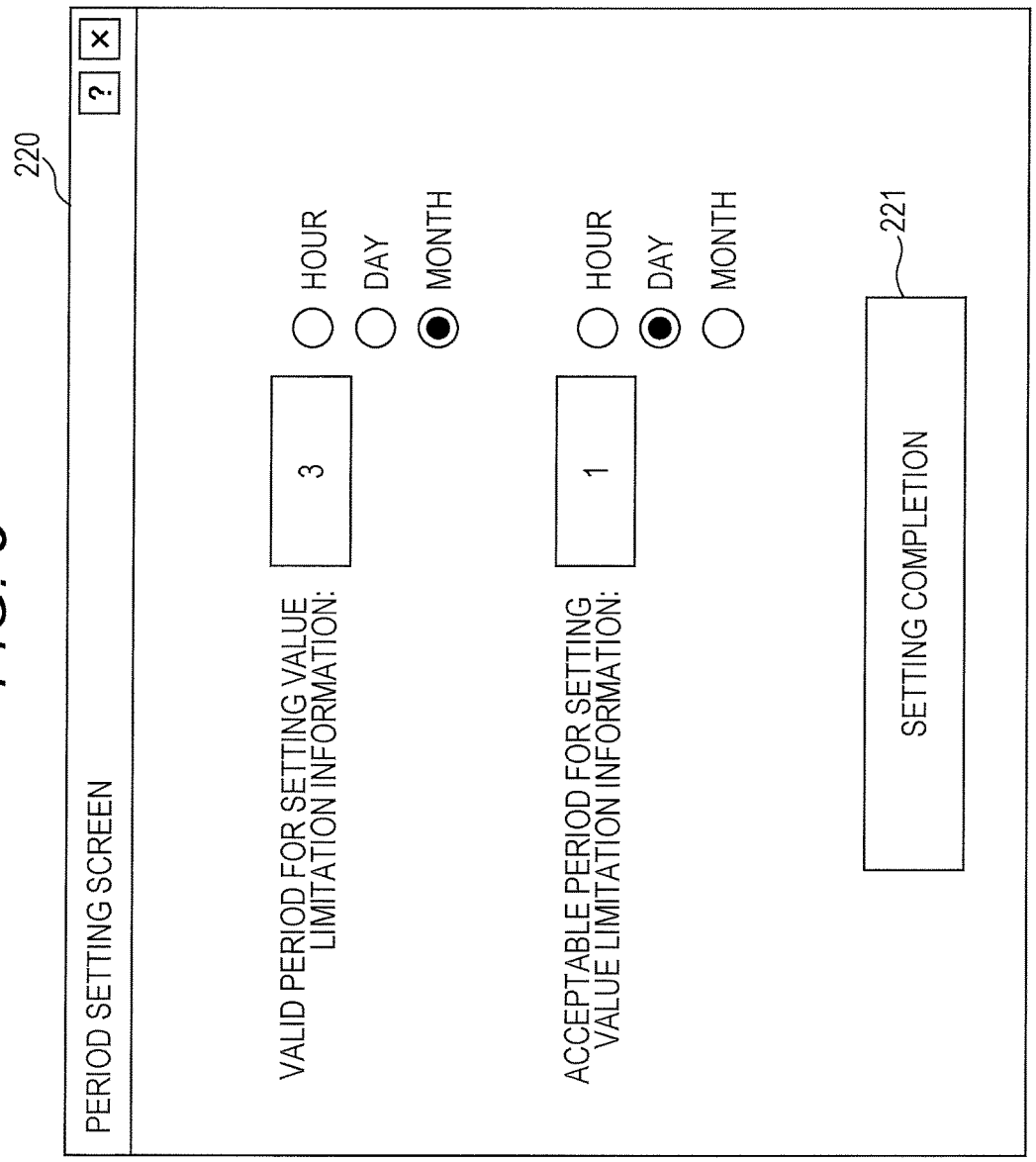
FIG. 5 is a diagram illustrating a period setting screen.

Upon finishing to set the setting value limitations, the administrator presses a setting completion button 211 within the limitation setting screen 210 (FIG. 4) and then a period setting screen 220 is displayed on the display unit of the computer 70 (print management device) (refer to FIG. 5).

The administrator individually sets two periods on this period setting screen 220, namely, the valid period AP and the acceptable period RP (to be described later) for the setting value limitation information.

Specifically, the administrator first sets the valid period AP for the setting value limitation information on the period setting screen 220. The valid period AP is a period for which update is unnecessary for the setting value limitation information within the print control device 30 (a period not requiring update). In other words, the print control device 30 (print control program) can use the setting value limitation information within the own device during the valid period AP set for the setting value limitation information within the own device to cause the MFP 10 to execute the print job without accessing the print management server 50. As illustrated in FIG. 5, the administrator here sets the valid period AP for the setting value limitation information to "3" and "month" (three months).

Next, the administrator also sets the acceptable period RP (to be described next) for the setting value limitation information on the period setting screen 220. The acceptable period RP is a period provided so as to follow the valid period AP for the setting value limitation information, serving as a period for which the setting value limitation information before update is exceptionally allowed to be used. As illustrated in FIG. 5, the administrator here sets the acceptable period RP for the setting value limitation information to "1" and "day" (one day).

Once the above-described two periods are set, the administrator presses a setting completion button 221 within the period setting screen 220 (FIG. 5) and then the setting value limitation information is transmitted to the print management server 50 from the print management device 70. This setting value limitation information contains the valid period AP and the acceptable period RP for the setting value limitation information as well as the setting value limitations (limitation content) in regard to the respective print setting items. Subsequently, the setting value limitation information is stored within the print management server 50. After the setting value limitation information is stored to the print management server 50, a time stamp thereof (the time when the setting value limitation information is stored) is recorded within the setting value limitation information as an issuance time of this setting value limitation information. This issuance time is used when the setting value limitation information is updated as will be described later.

As described above, the administrator uses the print management device 70 (print management program) to set the setting value limitation information in advance and then store this setting value limitation information to the print management server 50.

Subsequently, the setting value limitation information stored in the print management server 50 is acquired by the print control device 30 (print control program) and then stored within the print control device 30. Additionally, the valid period AP (AP1) for the setting value limitation information within the print control device 30 is started by assuming a time point (T1) when the acquisition (download) thereof from the print management server 50 is completed as a beginning of period (refer to FIG. 7 and so on).

<1-2-2. Action of Print Control Program in Print Control Device 30, Etc.>

Figure 6:
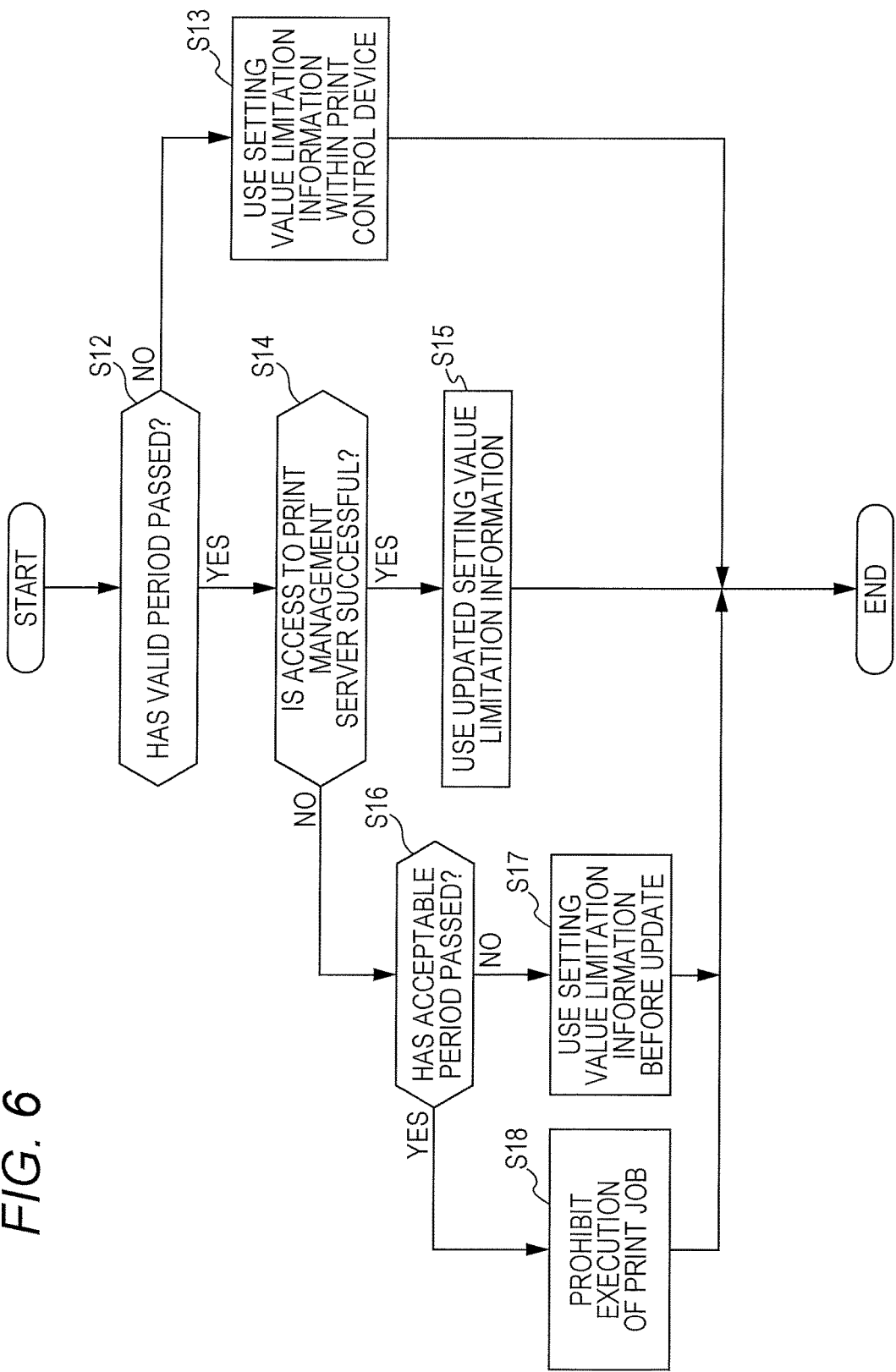
FIG. 6 is a flowchart illustrating an action of a print control program.

Next, an action of the print control program (here, the printer driver) in the print control device 30 will be described with reference to FIG. 6 and so on. FIG. 6 is a flowchart illustrating the action of the print control program.

It is assumed here that the setting value limitation information has been acquired from the print management server 50 and already stored within the print control device 30.

In the print control device 30, different types of processing from each other are carried out depending on whether the print control program is started up during the valid period AP (AP1) for the setting value limitation information or after this valid period AP (AP1) has passed. The processing in accordance with the startup timing of the print control program will be described below.

<When Print Control Program is Started Up During Valid Period>

When the print control program is started up during the valid period AP (AP1) for the setting value limitation information, the access to the print management server 50 is not required and thus the execution of the print job is allowed under a condition that the content of print setting conforms to the setting value limitation information within the print control device 30.

Specifically, after the print control program is started up at the print control device 30, the print control device 30 (print control program) determines whether the valid period AP for the setting value limitation information within the own device (here, "three months") has passed (step S12).

When the valid period AP has not passed, the print control device 30 uses the setting value limitation information within the print control device 30 at the time of the print setting by the user (step S13). Precisely, without attempting to access the print management server 50 during the valid period AP (AP1) for the setting value limitation information, the print control device 30 receives, from the user, a setting having the content of print setting conforming to the setting value limitation information within the print control device 30.

Here, the setting value limitation has been set by the administrator such that the setting value for the print setting item of "print type" is fixed to "double-sided printing" (refer to FIG. 4). Accordingly, the print setting value for the print setting item of "print type" is fixed to "double-sided printing" on the print setting screen (not illustrated) of the print control program based on the setting value limitation (limitation content) according to this setting value limitation information. In other words, on this print setting screen, the user of the print control device 30 cannot select "single-sided printing" as the print setting value for the print setting item of "print type". A method for limiting the print setting value (fixing the setting value to "double-sided printing") on the print setting screen includes disabling the setting of the print setting value to be limited (the setting value other than "double-sided printing", namely, "single-sided printing") (for example, by excluding or graying out) among the print setting values prepared in the print control program for the specific print setting item ("print type").

Thereafter, when the user presses a print execution button, the print job having the content of print setting conforming to this setting value limitation information is transmitted to the MFP 10 from the print control device 30. Subsequently, a document or the like to be printed is printed in double-sided printing at the MFP 10.

As described above, when the print control program is started up during the valid period AP for the setting value limitation information, the execution of the print job is allowed without requiring the access to the print management server 50. In addition, the execution of the print job is allowed under a condition that the print job has the content of print setting conforming to the setting value limitation information within the print control device 30.

<When Print Control Program is Started Up after Valid Period has Passed>

When the print control program is started up after the valid period AP (AP1) for the setting value limitation information has passed, the access to the print management server 50 is attempted and processing in accordance with a result of this access is carried out in the print control device 30.

Specifically, in a case where the print control program is started up after the valid period AP (AP1) for the setting value limitation information has passed, the processing passes step S12 and then proceeds to step S14 to determine whether the access to the print management server 50 is successful.

Precisely, when the print control program is started up after the valid period AP (AP1) for the setting value limitation information has passed, the print control device 30 (print control program) attempts to access the print management server 50.

When the access is successful (determined as "YES" in step S14), the processing proceeds to step S15. In step S15, the print control device 30 updates the setting value limitation information within the own device to use the setting value limitation information updated through the access at the time of the print setting by the user.

Specifically, after the print management server 50 is successfully accessed, the print control device 30 (print control program) compares the issuance time of the setting value limitation information within the print management server 50 with the issuance time of the setting value limitation information (the setting value limitation information before update) within the own device.

Subsequently, in a case where newer setting value limitation information than the setting value limitation information within the print control device 30 is found within the print management server 50, the print control device 30 acquires this newer setting value limitation information from the print management server 50. Upon acquiring the newer setting value limitation information, the print control device 30 updates the setting value limitation information within the own device (print control device 30) to this newer setting value limitation information. Precisely, the setting value limitation information currently stored within the print control device 30 is discarded, while the newer setting value limitation information is stored within the print control device 30. The print control device 30 then allows the execution of the print job under a condition that the print job has the content of print setting conforming to the updated setting value limitation information (the setting value limitation information newly stored within the print control device 30). Additionally in the print control device 30, once the newer setting value limitation information is acquired (downloaded), the valid period AP (AP2) set for the updated setting value limitation information is started by assuming a time point (T2) when the download is completed as a beginning of period (refer to FIG. 7).

On the other hand, in a case where the newer setting value limitation information is not found within the print management server 50 (a case where the print management server 50 stores the setting value limitation information having the same issuance time as the issuance time of the setting value limitation information within the print control device 30), the setting value limitation information before update within the print control device 30 is used as the updated setting value limitation information. In other words, even after successfully accessing the print management server 50, when the newer setting value limitation information is not found within the print management server 50, the setting value limitation information before update is continuously used (as the updated setting value limitation information). Subsequently, a new valid period AP (AP2) for the setting value limitation information within the print control device 30 (the setting value limitation information before update) is started by assuming a time point (T2) when the print management server 50 is accessed as a beginning of period.

Meanwhile, when the access to the print management server 50 is attempted in step S14 and as a result, this access is failed (determined as "NO"), the processing proceeds to step S16. Step S16 determines whether the acceptable period RP (RP1) for the setting value limitation information within the print control device 30 has passed.

Specifically, in a case where the print management server 50 cannot be accessed due to, for example, communication error between the print control device 30 and the print management server 50 after the valid period AP (API) has passed, step S16 determines whether the startup instruction for the print control program is given during the acceptable period RP (RP1) for the setting value limitation information. In other words, whether the access to the print management server 50 is failed during the acceptable period RP is determined.

As will be described below, different types of processing from each other (steps S17 and S18) are carried out in the print control device 30 depending on the determination result in step S16 (whether the access is failed during the acceptable period RP (RP1) or after the acceptable period RP (RP1) has passed).

<When Access to Print Management Server is Failed During Acceptable Period>

Even in a case where the access is failed after the valid period AP (AP1) for the setting value limitation information has passed, the setting value limitation information before update is (exceptionally) used during the acceptable period RP (RP1) for the setting value limitation information (step S17).

Note here that the service of the MFP 10 (the execution of the print job) is prohibited as a fundamental rule in the case of the access failure to the print management server 50 after the valid period AP (AP1) for the setting value limitation information has passed. In other words, as a fundamental rule, the user cannot cause the MFP 10 to carry out the printing output through the print control device 30 when the access is failed after the valid period AP has passed.

Figure 8:
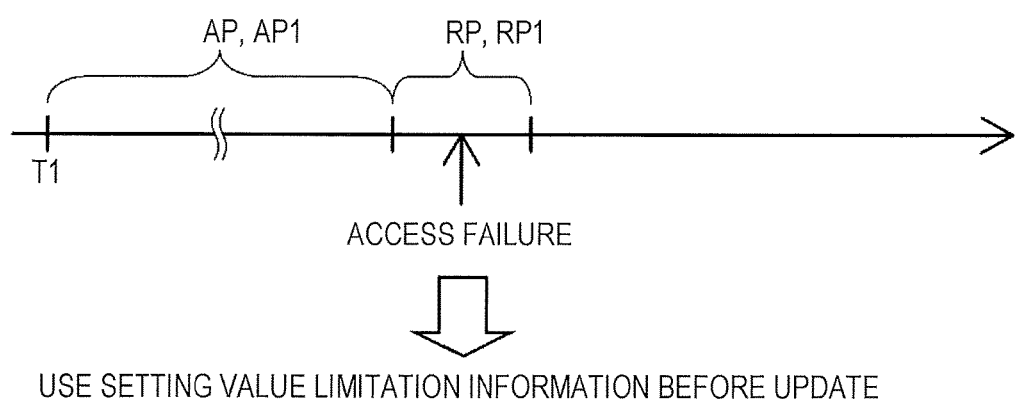
FIG. 8 is a conceptual diagram illustrating an action and so on when access to the print management server is failed during the acceptable period for the setting value limitation information.

However, even in a case where the access is failed after the valid period AP (AP1) has passed, the print control program does not suspend the service of the MFP 10 during the acceptable period RP (RP1) for the setting value limitation information (here, one day) and exceptionally uses the setting value limitation information before update to allow the execution of the print job (also refer to FIG. 8).

Subsequently, the print control device 30 receives, from the user, a setting having the content of print setting conforming to the setting value limitation information before update (the setting value limitation information for which the valid period AP has passed). Thereafter, in response to the print execution instruction from the user, the print job is transmitted to the MFP 10 under a condition that the print job has the content of print setting conforming to the setting value limitation information and then the print job is executed at the MFP 10.

As described above, even in a case where the access to the print management server 50 is failed after the valid period AP has passed, the execution of the print job is exceptionally allowed during the acceptable period RP under a condition that the print job has the content of print setting conforming to the setting value limitation information before update.

<When Access to Print Management Server is Failed after Acceptable Period has Passed>

Figure 10:
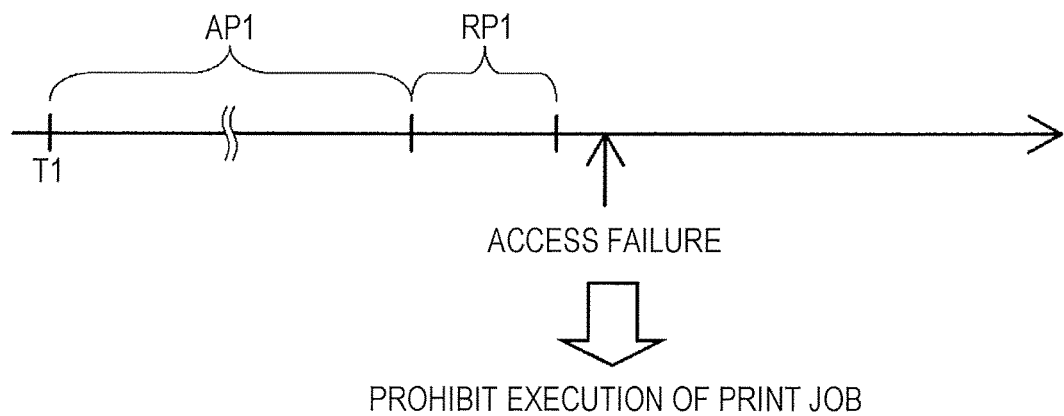
FIG. 10 is a conceptual diagram illustrating an action and so on when access to the print management server is failed after the acceptable period for the setting value limitation information has passed.

In a case where the access to the print management server 50 is failed after the valid period AP (AP1) for the setting value limitation information has passed and then the acceptable period RP (RP1) therefor has passed, (by following the fundamental rule) the execution of the print job is prohibited (step S18) (also refer to FIG. 10). In other words, when the access is failed after the acceptable period RP (RP1) has passed, the execution of the print job from the user is not allowed by the print control program and thus the user cannot cause the MFP 10 to carry out the printing output through the print control device 30.

Figure 9:
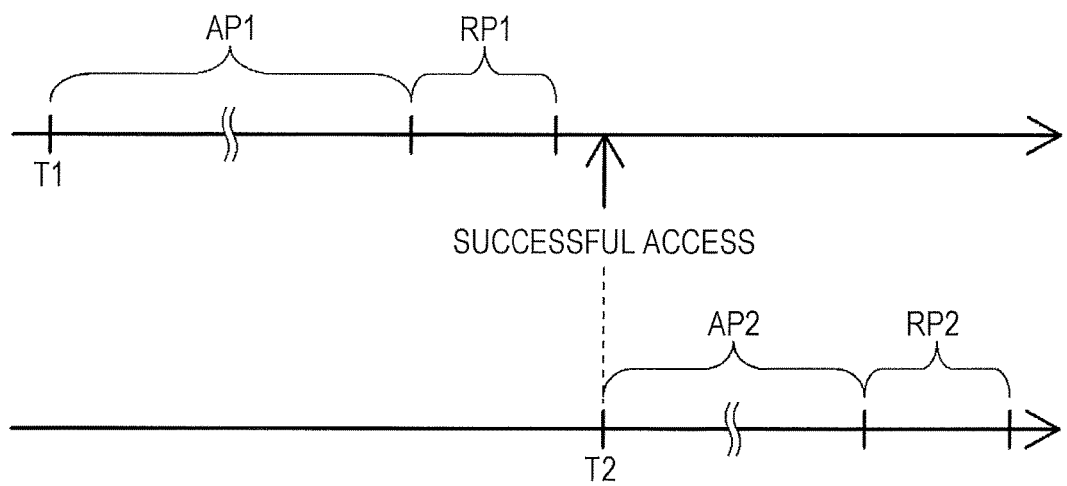
FIG. 9 is a conceptual diagram illustrating an action and so on when access to the print management server is successful after the acceptable period for the setting value limitation information has passed.

Meanwhile, in a case where the access is successful when the print control program is started up again after the access has been failed, for example, from a reason that the communication error between the print control device 30 and the print management server 50 has been solved, the processing proceeds to step S15 and then the setting value limitation information is updated (also refer to FIG. 9).

According to the action described above, even in a case where the access to the print management server 50 is failed after the valid period AP (AP1) for the setting value limitation information has passed, the execution of the print job is (exceptionally) allowed during the acceptable period RP (RP1) for this setting value limitation information under a condition that the print job has the content of print setting conforming to the setting value limitation information before update. As a result, it is possible to prevent the service of the MFP 10 from being uniformly suspended when the access to the print management server 50 is failed after the valid period AP for the setting value limitation information has passed (regardless of the timing of the access).

2. Second Embodiment

A second embodiment is a variation of the first embodiment. The following description will focus on a difference from the first embodiment.

The first embodiment has exemplified a mode in which the execution of the print job is prohibited in a case where the access to the print management server 50 is failed after the acceptable period RP (RP1) for the setting value limitation information has passed (refer to FIG. 10).

The second embodiment will exemplify a mode in which the execution of the print job is not prohibited even in a case where the access is failed after the acceptable period RP (RP1) has passed; instead, the execution of the print job is allowed under a condition that the print job has the content of print setting conforming to alternative setting value limitation information (to be described next).

The alternative setting value limitation information acts as limitation information (exceptionally) used as a substitute for the setting value limitation information in a case where the access to the print management server 50 is failed after the acceptable period RP (RP1) has passed.

It is preferable for the alternative setting value limitation information to have stricter limitation content than the limitation content of the setting value limitation information and at the same time, to have the strictest limitation content estimated by the administrator.

Specifically, the setting value limitation information serves as limitation information used by the print control device 30 (print control program) on a fundamental rule basis. In contrast to this, the alternative setting value limitation information serves as limitation information exceptionally used as a substitute for the setting value limitation information in a case where the access to the print management server 50 is failed after the acceptable period RP has passed. It is undesirable for the administrator in some cases that such limitation information used exceptionally (alternative setting value limitation information) has less strict limitation content than the limitation information used as a fundamental rule basis (setting value limitation information).

For example, such a situation is undesirable for the administrator that, even though the print setting value for the print setting item of "print type" is fixed to "double-sided printing" in the print setting during the valid period AP for the setting value limitation information for the purpose of a reduced cost or the like, the user is allowed to select "single-sided printing" in the print setting at the time when the access to the print management server 50 is failed after the acceptable period RP has passed.

Taking such a factor into account, the alternative setting value limitation information according to the embodiment has the strictest limitation content estimated by the administrator and at the same time, has stricter limitation content than the limitation content of the setting value limitation information. As a result, under an emergency circumstance such as the access failure to the print management server 50, it is possible for the administrator to allow the user to set only the content of print setting conforming to the strictest setting value limitation estimated by the administrator him/herself, thereby preventing the user from setting the content of print setting having a larger degree of freedom than that of the content of print setting while the setting value limitation information is used (under a normal circumstance).

<Setting of Setting Value Limitation Information and Alternative Setting Value Limitation Information>

The administrator estimates the limitation content of the setting value limitation information and the limitation content of the alternative setting value limitation information in advance to set each of the limitation information.

First, the administrator here sets the setting value limitation information at the computer 70 (print management device) as in the first embodiment (refer to FIG. 4).

Specifically, as illustrated in FIG. 4, the setting value limitation information is set such that the print setting values selectable by the user are limited for the two print setting items of "print type" and "toner save mode", whereas the print setting value selectable by the user is not limited for the print setting item of "color".

Next, the administrator sets the alternative setting value limitation information at the computer 70 (print management device).

Figure 11:
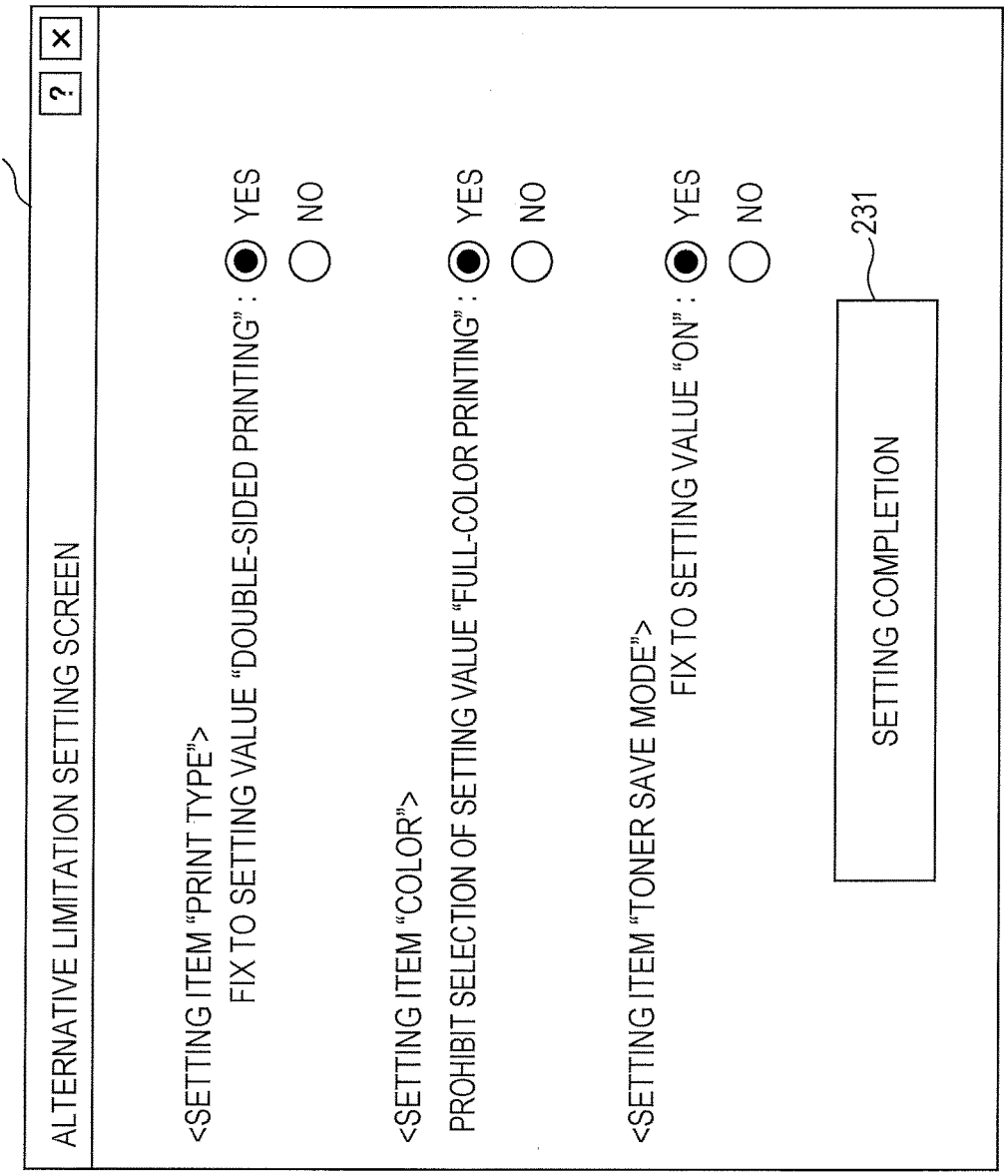
FIG. 11 is a diagram illustrating an alternative limitation setting screen.

FIG. 11 is a diagram illustrating a setting screen (alternative limitation setting screen) 230 for the alternative setting value limitation information.

As illustrated in FIG. 11, the print setting items displayed on the alternative limitation setting screen 230 are similar to the print setting items displayed on the limitation setting screen 210 (FIG. 4). On this alternative limitation setting screen 230, however, the administrator sets the alternative setting value limitation information having stricter limitation content than the limitation content of the setting value limitation information. As illustrated in FIG. 11, it is set here that the respective print setting values selectable by the user are limited for all of the print setting items ("print type", "color" and "toner save mode"). More precisely, the alternative setting value limitation information is set in such a manner that the two print setting items of "print type" and "toner save mode" are set so as to have the limitation content similar to that of the setting value limitation information but the print setting item of "color" is set so as to have stricter limitation content than the limitation content of the setting value limitation information (such that the print setting value is limited). In other words, the alternative setting value limitation information is set such that each of the plurality of print setting items has the limitation content equivalent to the limitation content of the setting value limitation information or stricter than the limitation content of the setting value limitation information. As described above, the alternative setting value limitation information is set so as to have the print setting value with a fewer number of options for the print setting value selectable by the user for a specific print setting item (here, "color") than the number of options in the setting value limitation information.

Once the alternative setting value limitation information is set and a setting completion button 231 within the alternative limitation setting screen 230 (FIG. 11) is pressed, as in the case of the setting value limitation information, the alternative setting value limitation information is transmitted to the print management server 50 from the print management device 70 to be stored within the print management server 50. Subsequently, the alternative setting value limitation information within the print management server 50 is acquired by the print control device 30 (print control program) and then stored within the print control device 30.

Here, when the administrator attempts to set the alternative setting value limitation information having less strict limitation content than the limitation content of the setting value limitation information (refer to FIG. 12), this alternative setting value limitation information is refused to be set by the print management program.

Figure 12:
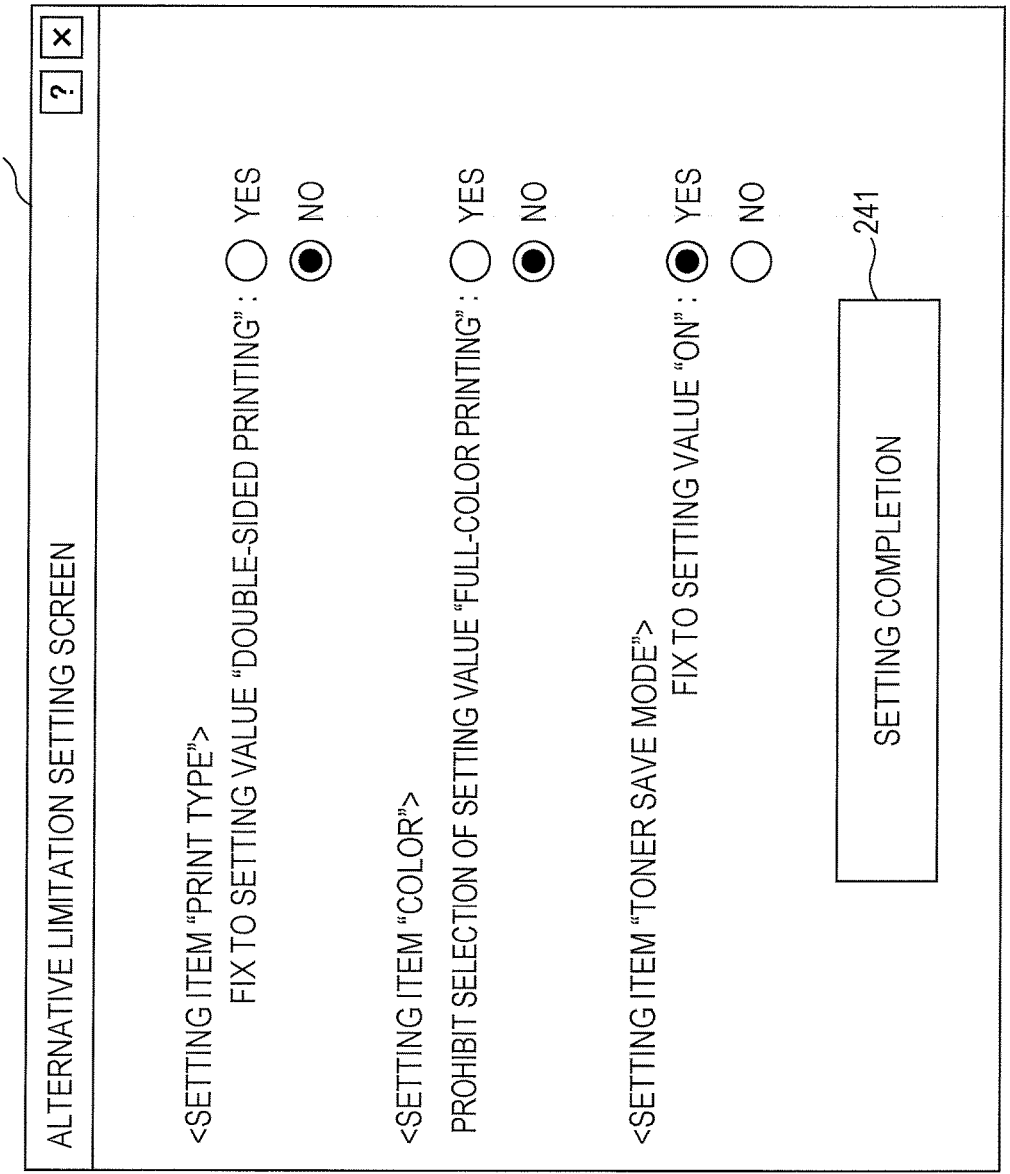
FIG. 12 is a diagram illustrating an alternative limitation setting screen.

For example, as illustrated in FIG. 4, the setting value limitation information has been already set such that the print setting value is limited for the print setting item of "print type" (fixed to the setting value of "double-sided printing"). Thereafter, as illustrated in FIG. 12, the administrator attempts to set the alternative setting value limitation information in which the print setting value is not limited for the print setting item of "print type" (not fixed to the setting value of "double-sided printing"). At this time, the print management program does not allow this alternative setting value limitation information to be set and displays a warning screen 310 (FIG. 13) on the display unit of the computer 70 as a message screen.

Figure 13:
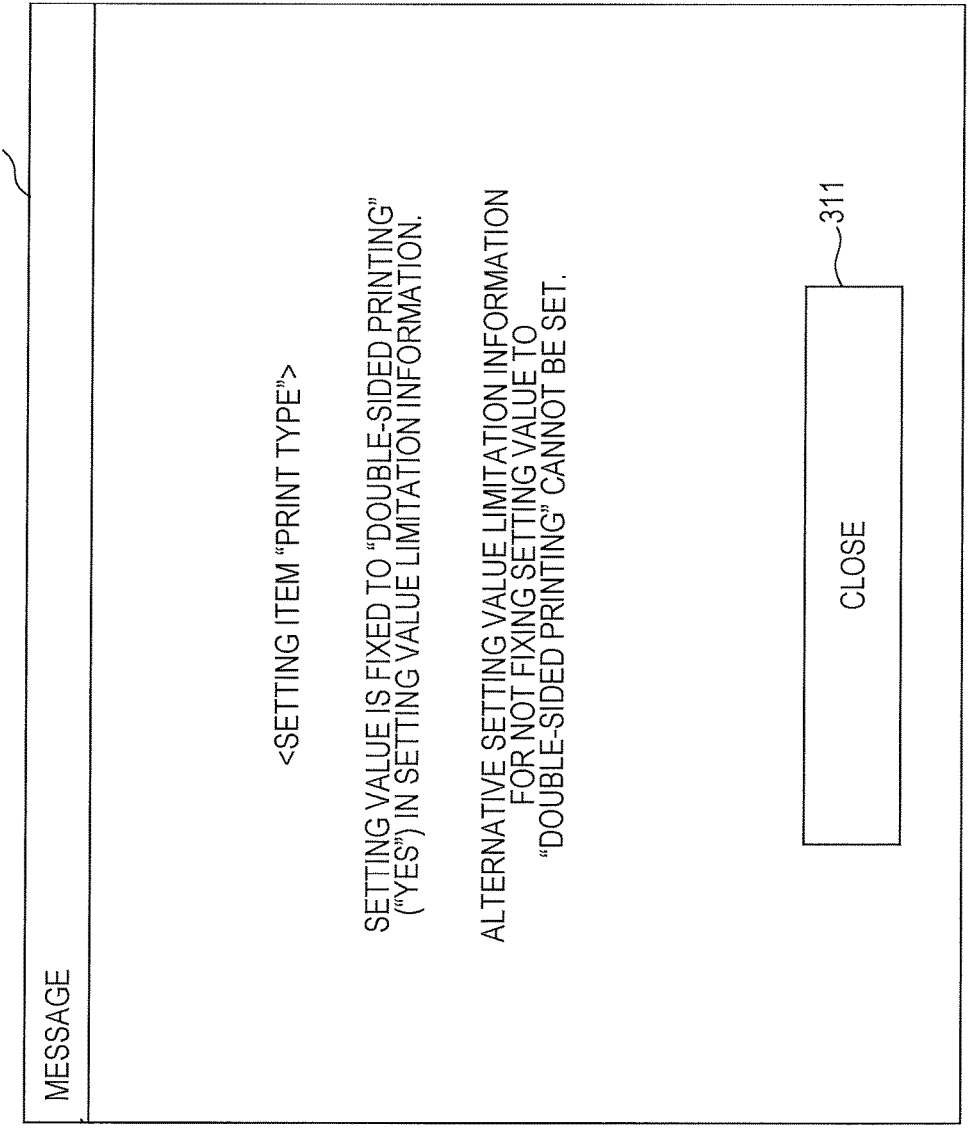
FIG. 13 is a diagram illustrating a warning screen.

FIG. 13 is a diagram illustrating the warning screen 310. As illustrated in FIG. 13, this warning screen 310 displays a message (warning message) indicating that it is not possible (not allowed) to set the alternative setting value limitation information in which the setting value for the print setting item of "print type" is not fixed to the "double-sided printing". Subsequently, a "close" button 311 within the warning screen 310 (FIG. 13) is pressed and then the administrator resets the alternative setting value limitation information or resets the setting value limitation information.

As described above, when the alternative setting value limitation information is attempted to be set by the administrator so as to have less strict limitation content than the limitation content of the setting value limitation information, this alternative setting value limitation information is refused to be set by the print management program. In other words, the alternative setting value limitation information is refused to be set by the print management program as long as any one of the plurality of print setting items therein has less strict limitation content than the limitation content of the setting value limitation information.

Instead of requiring the reset of the alternative setting value limitation information or the reset of the setting value limitation information, the alternative setting value limitation information or the setting value limitation information may be configured to be automatically changed when the alternative setting value limitation information having less strict limitation content than the limitation content of the setting value limitation information is attempted to beset.

Specifically, the alternative setting value limitation information may be configured to be automatically changed such that each of the plurality of print setting items in the alternative setting value limitation information has the limitation content equivalent to the limitation content of the setting value limitation information or stricter than the limitation content of the setting value limitation information. For example, the setting content of the alternative setting value limitation information may be configured to be automatically changed at the time when the "close" button 311 is pressed on the warning screen 310 (FIG. 13), from the setting content for not fixing the print setting value to "double-sided printing" to the setting content for fixing the print setting value to "double-sided printing" in regard to the print setting item of "print type".

Alternatively, the setting value limitation information may be configured to be automatically changed such that each of the plurality of print setting items in the setting value limitation information has the limitation content equivalent to the limitation content of the alternative setting value limitation information or less strict than the limitation content of the alternative setting value limitation information. For example, the setting content of the setting value limitation information may be configured to be automatically changed so as to have the limitation content equivalent to the limitation content of the alternative setting value limitation information or less strict than the limitation content of the alternative setting value limitation information, from the setting content for fixing the print setting value to "double-sided printing" to the setting content for not fixing the print setting value to "double-sided printing" in regard to the print setting item of "print type".

<Action of Print Control Program in Print Control Device 30, Etc.>

Figure 14:
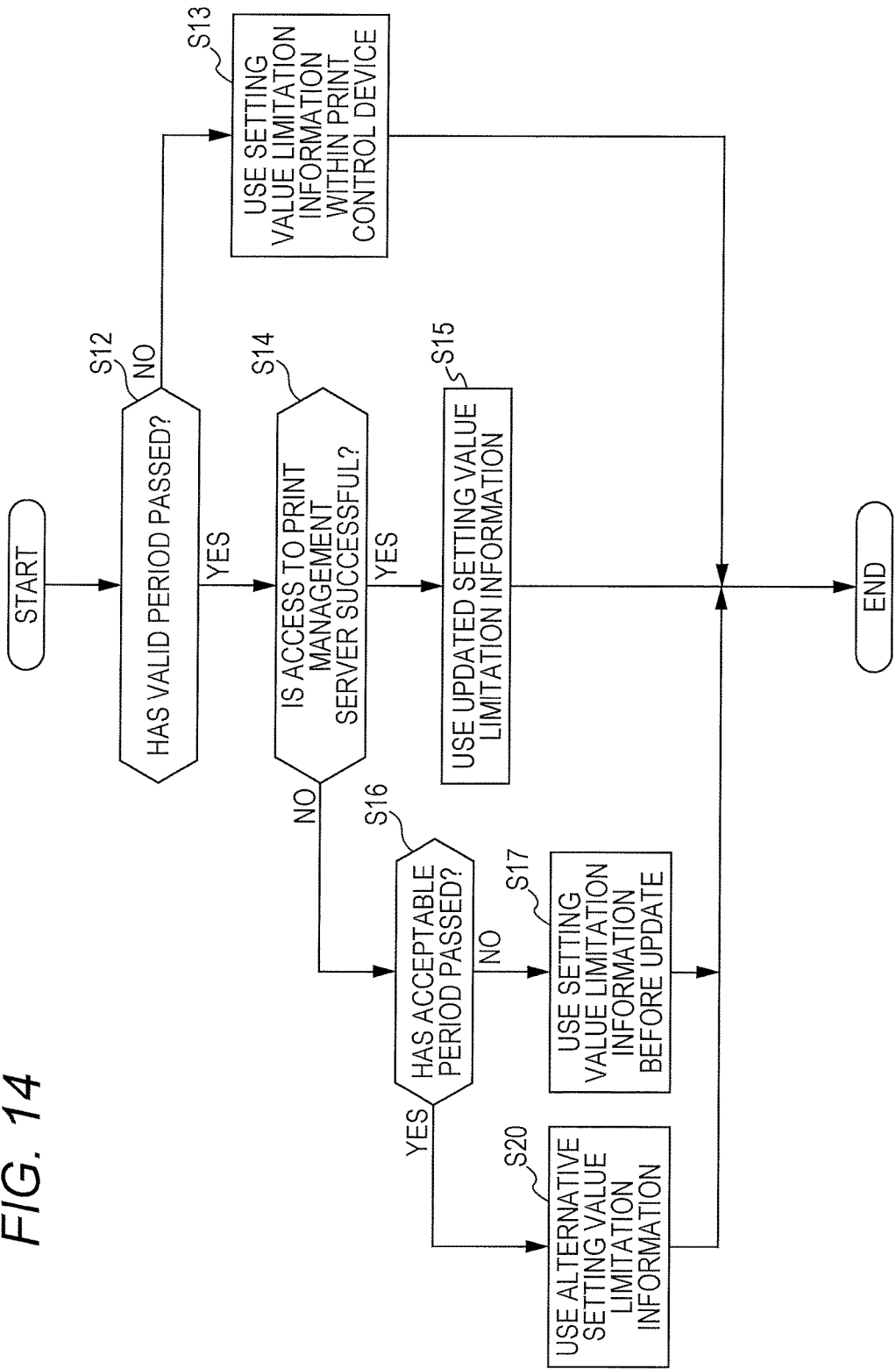
FIG. 14 is a flowchart illustrating an action of a print control program according to a second embodiment.

Next, the action of the print control program according to the second embodiment will be described with reference to FIG. 14. FIG. 14 is a flowchart illustrating the action of the print control program according to the second embodiment.

Processing from step S12 through step S17 in the second embodiment is similar to the processing from step S12 through step S17 in the first embodiment (FIG. 6).

Specifically, the setting value limitation information within the print control device 30 is used during the valid period AP for this setting value limitation information without requiring the access to the print management server 50 (step S13). After the valid period AP has passed, the access to the print management server 50 is attempted. In the case of the successful access after the valid period AP has passed, the updated setting value limitation information is used (step S15). In the case of the access failure after the valid period AP has passed, the setting value limitation information before update is exceptionally used during the acceptable period RP for the setting value limitation information (step S17).

According to this second embodiment, in a case where the access is failed after the valid period AP has passed and then the acceptable period RP has passed, processing in step S20 is carried out (rather than the processing in step S18).

Specifically, in step S20, when the access to the print management server 50 is failed after the valid period AP (AP1) has passed and then the acceptable period RP (RP1) has passed, the alternative setting value limitation information stored within the print control device 30 is used as a substitute for the setting value limitation information at the time of the print setting by the user. In other words, even in a case where the access to the print management server 50 is failed after the acceptable period RP (RP1) has passed, the service of the MFP 10 is not suspended and thus the execution of the print job is allowed under a condition that the print job has the content of print setting conforming to the alternative setting value limitation information.

For example, in the alternative setting value limitation information as illustrated in FIG. 11, the print setting values selectable by the user are limited for all of the print setting items ("print type", "color" and "toner save mode"). Accordingly, the user cannot select "single-sided printing" for the print setting item of "print type" on the print setting screen of the print control program as in the print setting while the setting value limitation information is used (under a normal circumstance) and at the same time, the user also cannot select "OFF" for the print setting item of "toner save mode". Furthermore, in a case where the access to the print management server 50 is failed after the acceptable period RP has passed, the user cannot select "full-color printing" for the print setting item of "color" unlike the print setting while the setting value limitation information is used (under a normal circumstance).

As described above, even when the access to the print management server 50 is failed after the acceptable period RP has passed, the service itself of the MFP 10 is not suspended. During the print setting, however, the user is required to conform to the alternative setting value limitation information having stricter limitation content than the limitation content of the setting value limitation information. Subsequently, the execution of, the print job is allowed under a condition that the print job has the content of print setting conforming to this alternative setting value limitation information.

Meanwhile, in a case where the access is successful when the print control program is started up again after the access has been failed, for example, from a reason that the communication error between the print control device 30 and the print management server 50 has been solved, the processing proceeds to step S15 and then the setting value limitation information is updated (also refer to FIG. 9). Additionally, in a case where newer alternative setting value limitation information is found within the print management server 50 at the time when the access is successful, this newer alternative setting value limitation information is acquired and then the alternative setting value limitation information within the print control device 30 is updated to this newer alternative setting value limitation information.

As described above, according to the second embodiment, in a case where the access to the print management server 50 is failed after the acceptable period RP for the setting value limitation information has passed, the alternative setting value limitation information is used as a substitute for this setting value limitation information. As a result, it is possible to prevent the service of the MFP 10 from being suspended even when the access to the print management server 50 is failed after the valid period AP for the setting value limitation information has passed and then the acceptable period RP therefor has passed.

Meanwhile, the alternative setting value limitation information has stricter limitation content than the limitation content of the setting value limitation information. In addition, this alternative setting value limitation information is used as a substitute for the setting value limitation information in the case of the access failure after the acceptable period RP has passed. In other words, when the access is failed after the acceptable period RP has passed, the execution of the print job is allowed under a condition that the print job conforms to the alternative setting value limitation information having stricter limitation content than the limitation content of the setting value limitation information. As a result, in a case where the access is failed after the acceptable period RP has passed, it is possible to prevent the user from setting the content of print setting having a larger degree of freedom than that of the content of print setting while the setting value limitation information is used.

The above-described second embodiment has exemplified a mode in which the alternative setting value limitation information is set after the setting value limitation information has been set. However, the mode is not limited thereto and the setting value limitation information may be set after the alternative setting value limitation information has been set.

In addition, the above-described second embodiment has exemplified a mode in which the alternative setting value limitation information is acquired from the print management server 50 to be stored within the print control device 30. However, the mode is not limited thereto and the alternative setting value limitation information may be included in an installation package of the print control program so as to be stored within the print control device 30 during the installation of the print control program.

3. Variations, Etc.

The embodiments of the invention have been described thus far. However, the invention is not construed to be limited to the content described above.

For example, the aforementioned embodiments have exemplified a mode in which the access to the print management server 50 is not attempted during the valid period AP for the setting value limitation information. However, the mode is not limited thereto and the access to the print management server 50 may be attempted regularly or irregularly during the valid period AP.

Specifically, the access to the print management server 50 may be configured to be attempted regularly (for example, every other week) during the valid period AP for the setting value limitation information. Alternatively, the access may be configured to be (irregularly) attempted every time the startup instruction for the print control program is received from the user a predetermined number of times (for example, five times) during the valid period AP.

Additionally, although the print control program is executed in the personal computer in the aforementioned embodiments, the configuration is not limited thereto and the print control program may be configured to be executed in a computer such as a smartphone.

Furthermore, the aforementioned embodiments have exemplified a mode in which the computer 30 (a different device from the MFP 10) is used as the print control device. However, the mode is not limited thereto and the MFP 10 itself may be configured to be used as the print control device.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A print control device comprising:
    an acquisition unit that acquires, from a print management server capable of communicating with the print control device, setting value limitation information that limits a print setting value selectable by a user among a plurality of print setting values for a specific print setting item, to store within the print control device; and
    a control unit that controls whether the execution of a print job is allowed based on the setting value limitation information within the print control device, wherein
    the control unit:
    allows the execution of the print job during a valid period set for the setting value limitation information without requiring access to the print management server under a condition that the print job has the content of print setting conforming to the setting value limitation information;
    attempts the access after the valid period has passed;
    in a case where the access is successful, allows the execution of the print job under a condition that the print job has the content of print setting conforming to the setting value limitation information updated through the access; and
    even in a case where the access is failed after the valid period has passed, allows the execution of the print job during an acceptable period provided so as to follow the valid period under a condition that the print job has the content of print setting conforming to the setting value limitation information before update.

2. The print control device according to claim 1, wherein once the access is successful, the acquisition unit acquires newer setting value limitation information from the print management server and uses the newer setting value limitation information as the updated setting value limitation information.

3. The print control device according to claim 1, wherein the acquisition unit:
    in a case where the access is successful, when newer setting value limitation information is found within the print management server, acquires the newer setting value limitation information from the print management server and uses the newer setting value limitation information as the updated setting value limitation information; and
    even in a case where the access is successful, when the newer setting value limitation information is not found within the print management server, uses the setting value limitation information before update as the updated setting value limitation information.

4. The print control device according to claim 1, wherein in a case where the access is failed after the valid period has passed and then the acceptable period has passed, the control unit prohibits the execution of the print job.

5. The print control device according to claim 1, wherein in a case where the access is failed after the valid period has passed and then the acceptable period has passed, the control unit allows the execution of the print job under a condition that the print job has the content of print setting conforming to alternative setting value limitation information used as a substitute for the setting value limitation information and stored within the print control device.

6. The print control device according to claim 5, wherein the alternative setting value limitation information has stricter limitation content than the limitation content of the setting value limitation information.

7. The print control device according to claim 5, wherein in a case where the access is successful, when newer alternative setting value limitation information is found within the print management server, the acquisition unit acquires the newer alternative setting value limitation information from the print management server and updates the alternative setting value limitation information within the print control device to the newer alternative setting value limitation information.

8. A non-transitory recording medium storing a computer readable program built in a print control device causing a computer to carry out:
    a) a process of acquiring, from a print management server capable of communicating with the print control device, setting value limitation information that limits a print setting value selectable by a user among a plurality of print setting values for a specific print setting item, to store within the print control device; and
    b) a process of controlling whether the execution of a print job is allowed based on the setting value limitation information within the print control device, wherein
    in the process b):
    the execution of the print job is allowed during a valid period set for the setting value limitation information without requiring access to the print management server under a condition that the print job has the content of print setting conforming to the setting value limitation information;
    the access is attempted after the valid period has passed;
    in a case where the access is successful, the execution of the print job is allowed under a condition that the print job has the content of print setting conforming to the setting value limitation information updated through the access; and
    even in a case where the access is failed after the valid period has passed, the execution of the print job is allowed during an acceptable period provided so as to follow the valid period under a condition that the print job has the content of print setting conforming to the setting value limitation information before update.

9. A print system comprising:
    a print management server; and
    a print control device capable of communicating with the print management server, wherein
    the print management server includes a transmission unit that transmits, to the print control device, setting value limitation information that limits a print setting value selectable by a user among a plurality of print setting values for a specific print setting item, the print control device includes:

an acquisition unit that acquires the setting value limitation information from the print management server to store within the print control device; and a control unit that controls whether the execution of a print job is allowed based on the setting value limitation information within the print control device, and the control unit:

allows the execution of the print job during a valid period set for the setting value limitation information without requiring access to the print management server under a condition that the print job has the content of print setting conforming to the setting value limitation information;

attempts the access after the valid period has passed;

in a case where the access is successful, allows the execution of the print job under a condition that the print job has the content of print setting conforming to the setting value limitation information updated through the access; and even in a case where the access is failed after the valid period has passed, allows the execution of the print job during an acceptable period provided so as to follow the valid period under a condition that the print job has the content of print setting conforming to the setting value limitation information before update.

* * * * *